United States Patent
Mokhbery et al.

(10) Patent No.: US 10,527,509 B2
(45) Date of Patent: Jan. 7, 2020

(54) HERMETICALLY SEALED SENSOR

(71) Applicant: FUTEK Advanced Sensor Technology, Irvine, CA (US)

(72) Inventors: Javad Mokhbery, Irvine, CA (US); Richard Walker, Irvine, CA (US); Maciej Lisiak, Irvine, CA (US)

(73) Assignee: FUTEK Advanced Sensor Technology, Irvine, CA (US)

( * ) Notice: Subject to any disclaimer, the term of this patent is extended or adjusted under 35 U.S.C. 154(b) by 236 days.

(21) Appl. No.: 15/280,114

(22) Filed: Sep. 29, 2016

(65) Prior Publication Data

US 2018/0087980 A1 Mar. 29, 2018

(51) Int. Cl.
*G01L 5/16* (2006.01)
*G01L 1/22* (2006.01)

(52) U.S. Cl.
CPC ............ *G01L 5/162* (2013.01); *G01L 1/2218* (2013.01)

(58) Field of Classification Search
CPC ..... G01L 1/2287; G01L 1/2262; G01L 5/162; G01L 1/2218
USPC .......................................................... 73/774
See application file for complete search history.

(56) References Cited

U.S. PATENT DOCUMENTS

| 5,311,400 | A | * | 5/1994 | Fuchs | .................... | G01C 19/04 |
|---|---|---|---|---|---|---|
| | | | | | | 174/261 |
| 5,709,724 | A | * | 1/1998 | Naugler | .................. | C03C 27/02 |
| | | | | | | 65/59.4 |
| 6,470,759 | B1 | | 10/2002 | Scott | | |
| 6,883,379 | B2 | * | 4/2005 | Kaneko | ............... | G01L 19/0061 |
| | | | | | | 73/706 |
| 7,131,334 | B2 | * | 11/2006 | Mei | ...................... | G01L 19/0061 |
| | | | | | | 73/715 |
| 2007/0151357 | A1 | * | 7/2007 | Kurtz | ....................... | G01B 7/18 |
| | | | | | | 73/777 |

FOREIGN PATENT DOCUMENTS

| CA | 2498805 A1 | 4/2004 |
|---|---|---|
| EP | 0106900 A1 | 5/1984 |
| EP | 0319176 A2 | 6/1989 |

* cited by examiner

*Primary Examiner* — Nimeshkumar D Patel
*Assistant Examiner* — Jean F Morello
(74) *Attorney, Agent, or Firm* — Young Basile Hanlon & MacFarlane, P.C.

(57) ABSTRACT

A sensor such as a load cell includes a metal body containing the sensor electronics and flexure elements. Power is brought into the electronics and signals are taken out via header pins arranged in any of various groupings so as to extend through holes in the body. The pins are fixed by means of fused glass or ceramic material and the body is sealed to tolerate harsh environmental conditions.

7 Claims, 6 Drawing Sheets

HERMETICALLY SEALED SENSOR

FIELD OF THE INVENTION

The present invention relates to sensors such as load cells, pressure and/or torque sensors and, more particularly, to a hermetically sealed sensor capable of surviving harsh environment conditions such as high temperatures and/or pressure extremes associated with autoclave and sterilization for use in medical procedures.

BACKGROUND OF THE INVENTION

Sensors such as load cell and pressure or torque sensors typically come in various forms that allow a physical condition such as force or pressure or torque to be measured. The influence of the condition is converted to an electrical signal that varies according to the magnitude of the sensed condition or quality.

Such types of sensor can use strain gages attached to an elastically deformable member. The strain gage is deformed with the deformable member and this deformation changes the resistance of the gage or gages. By connecting the gages into a Wheatstone bridge circuit, a change in resistance unbalances the bridge and produces an output representing applied load, torque or pressure when properly calibrated. Sensor elements other than variable resistance strain gages can be used.

Such sensors have been used in applications requiring the active elements to be hermetically sealed to protect them from potentially damaging environmental conditions such as the high temperatures associated with autoclaving or sterilization in a medical setting. A closed cell for the sensor components and associated electronics is typically created by two body elements, one of which includes a "header," i.e., a group of pin-like insulated conductors passing through a wall of the body part and into the interior. This body part must be attached to a second, mating body part carrying the flexure element and the associated circuitry, mated and secured to each other such as by welding. This approach is only achievable on larger devices where overall size and shape allow for separate header and flexure components to be welded together.

SUMMARY OF THE INVENTION

The present disclosure focuses on a sensor here in the form of a load cell that has an essentially monolithic annular body wherein the header elements pass through the same body part that houses the flexure element and the electrical circuitry. The result is a sensor cell that can survive harsh conditions of temperatures and pressure (including vacuum) that prior art designs cannot tolerate.

A first aspect of the invention is a hermetically sealed such as a load cell sensor. The sensor comprises a one piece body with a wall, which may be annular, enclosing a flexure element and circuitry. The one piece shell body has an interior surface and an exterior surface. Holes for header pins are located in the one piece body wall and extend fully through the wall. Header pins are disposed in the plurality of holes for the purpose of connecting power into the sensor and conveying signals out. A seal of glass or ceramic is formed in each of the holes to hold the respective pin in the one piece shell body and to hermetically seal the holes. In the case of a load cell, a flexure member is secured to the interior surface of the one piece shell body such as by spanning the interior walls. A load bearing member extends from the flexure member. Strain gage resistors are affixed to the flexure member and connected in electrical communication to the pins. A force applied to the load bearing member flexes some of the strain gage as described above thereby unbalancing a bridge circuit and producing an output signal on a set of the pins.

A second aspect of the present disclosure is a method for producing a small scale hermetically sealed, monolithic sensor such as a load cell. The method includes providing a one piece shell body; sealingly installing header pins into the holes formed in the one piece shell body by means of fusible glass or ceramic material; heat treating the one piece shell body to fuse the glass or ceramic material thereby securing the pins into the header pin holes; installing wires and circuitry after the heat treating has been completed; and installing one or more diaphragm type covers on the one piece shell body to hermetically seal the sensor. A fixture holds the pins in the correct position during the fusing step.

BRIEF DESCRIPTION OF THE DRAWINGS

The various features, advantages and other uses of the present small scale hermetically sealed load sensor will become more apparent in view of the following description and drawings which are to scale and in which.

DETAILED DESCRIPTION OF THE PREFERRED EMBODIMENTS

Figure 1:
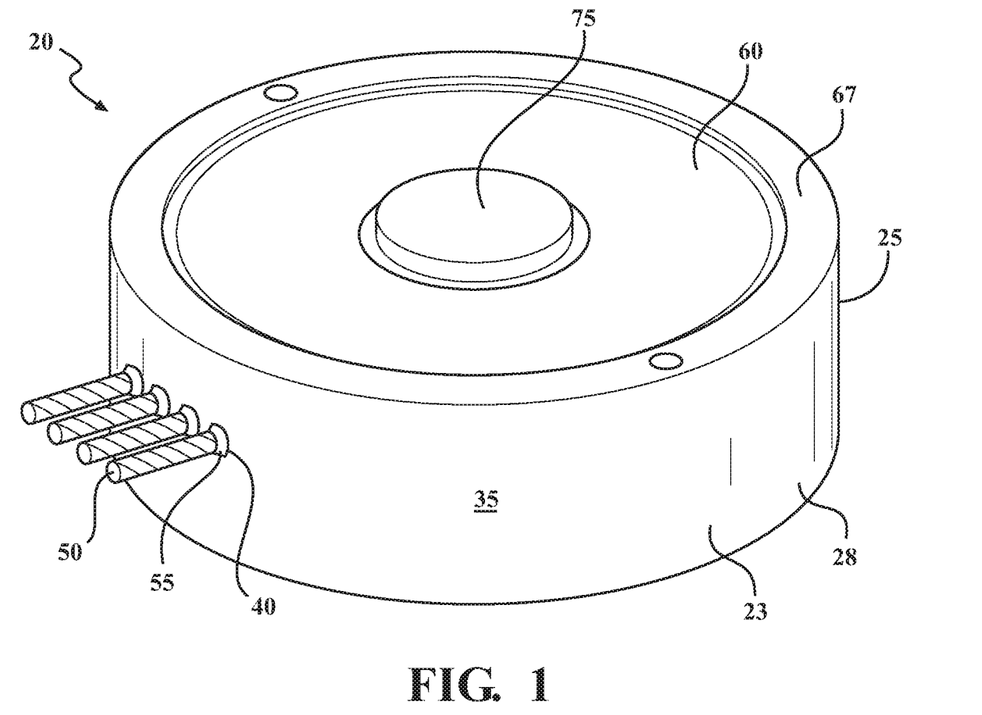
FIG. 1 is a perspective view of a small scale hermetically sealed load sensor.
Figure 2:
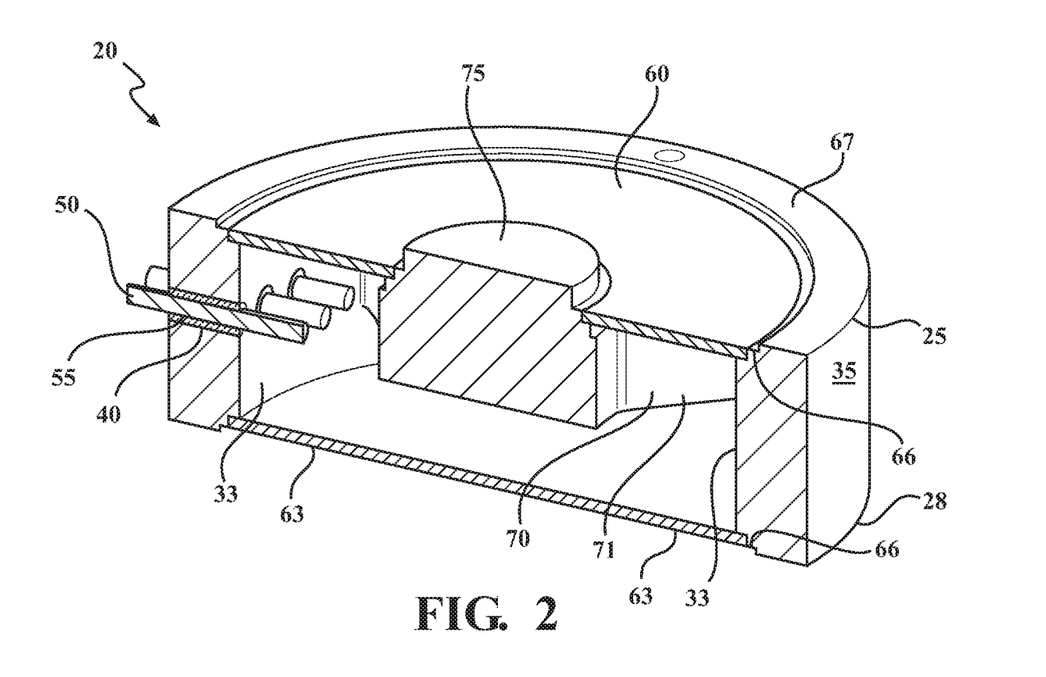
FIG. 2 is a cross sectional view of the small scale hermetically sealed load sensor of FIG. 1.
Figure 3:
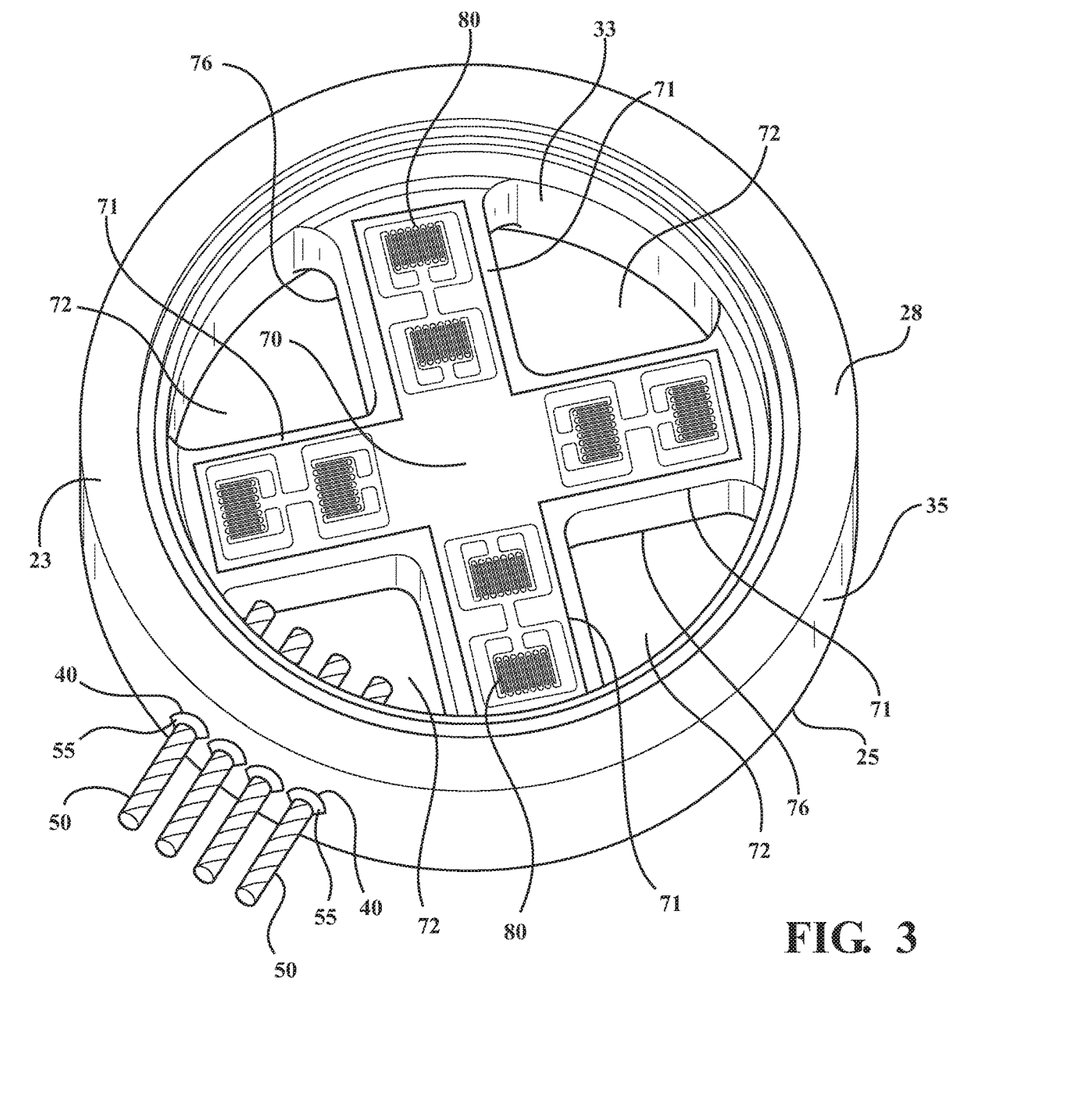
FIG. 3 is a perspective view of the internal structure of the small scale hermetically sealed sensor of FIG. 1.

FIGS. 1 through 3 show an illustrative embodiment of a small scale hermetically sealed load sensor 20 made from a one piece shell body 23.

The one piece shell body 23 has a hollow cylindrical, i.e., annular shape extending between an open first end 25 of the one piece shell body 23 and an opposite open second end 28 of the one piece shell body 23. The body has an interior surface 33 and exterior surface 35. The interior surface 33 and exterior surface 35 together define circular interior and exterior perimeters, respectively, of the one piece shell body 23. In other embodiments, these perimeters may have different shapes, for example, a square external perimeter with a circular interior perimeter.

A plurality of cylindrical holes 40 are formed in the one piece shell body 23 between the first end 25 and second end 28. The holes 40 extend fully through the one piece shell body 23 from the interior surface 33 through to the exterior surface 35. The holes 40 may be parallel to one another, grouped, or otherwise arranged as disclosed below. The holes are generally perpendicular to a cross section of the body wall as shown in FIG. 2.

A plurality of electrical connector or "header" pins 50 are disposed within the holes 40, with each pin 50 being disposed in an individual hole 40. The pins 50 are of a length that is greater than the thickness of the body wall, such that the pins 50 are able to extend beyond both the interior surface 33 and the exterior surface 35 of the one piece shell body 23 when the pins 50 are finally affixed in the holes 40. The pins 50 are generally cylindrical in shape. Ends of the pins 50 may be flattened (not shown) to facilitate connection of electrical components, as further discussed below.

Seal members 55 are disposed within the holes 40, surrounding the pins 50 and filling the annular spaces between the exterior surfaces of the pins and the interior surfaces of the holes 40. A suitable fixture holding both the body and the pins is used to properly locate the pins so that they do not touch the surrounding surfaces of the holes. The seal member 55 contactingly surrounds the entire circumference of a center portion of each pin 50 and the entire inner circumference of the hole 40, filling the space between the pin 50 and hole 40. The seal members 55, when fused, hermetically seal the holes 40 and prevent entry of foreign matter into the sensor 20 while providing electric insulation and insulation between the pins 50 and one piece shell body 23, the latter typically being made of a conductive metal. Each seal member 55 is made of glass, ceramic, or other similar material capable of being heat fused but tolerant of harsh environments of temperature, pressure or vacuum such as, for example, the temperatures used in autoclaving processes in medical facilities. Specifically, the seal member 55 is a glass, ceramic or other material capable of maintaining the hermetic seal of the sensor 20 when subjected to steam above 120 degrees Celsius at 100 kPA above atmospheric pressure for 15 minutes. To seal the shell body and the header pin 50 with the seal members, the seal members 55 are fused to the pin 50 and the shell body 23.

The open first end 25 and open second end 28 of the one piece shell body 23 are enclosed by a washer shaped first diaphragm 60 and a disk shaped second diaphragm 63, respectively. It will be understood that the terms "one piece" and "monolithic," as used herein, refer to the fact that the same body part is used to support both the flexure element and the header pins. The first diaphragm 60 and second diaphragm 63 are disposed within the one piece shell body 23 at their respective ends 25, 28. To receive the diaphragms 60 and 63, the perimeter of the interior surface 35 at the first end 25 and second end 28 is formed with a step shaped surface 66 designed to conform to an outer circumference of the diaphragms 60 63. The step shaped cross section 66 includes two steps formed by surfaces that extend alternately between an axial direction and a radial direction of a central axis of cylindrical shaped one piece shell body 23. At the first step, the interior surface 33 has a smaller circumference, as compared to the interior surface 33 at the second step. The diameter defined by the circumference at first step is generally equal to the diameter of the outer circumference of the diaphragm 60, 63 residing therein. The second step provides an area for a sealing and securing material, such as a welding bead, to hermetically seal the first diaphragm 60 to the one piece shell body 23 at a location interior of a most distal surface 67 of the first end 25.

A cross shaped flexure member 70 is disposed within, and secured to one piece shell body 23. The cross shaped flexure member 70 includes four legs 71 that extend generally perpendicularly from four locations around the interior surface 33, with each location separated generally by 90 degrees rotationally. The four legs 71 meet in a center of the hollow interior of the one piece shell body 23, as shown in FIG. 3. The four legs 71 of the cross shaped flexure member 70 define four quadrants 72.

A load bearing member 75 extends generally perpendicularly from the center of a top surface 76 the flexure member along the central axis of cylindrical shaped one piece shell body 23. The load bearing member 75 extends though the washer shaped first diaphragm 60 beyond the most distal surface 67 of the first end 25. The load bearing member 75 has a circumferential step shaped surface 77 similar to step shaped surface 66 running the perimeter of the interior surface 35 at the first end 25. The step shaped surface 77 is designed to receive an interior circumference of the washer shaped first diaphragm 60 and the corresponding sealing and securing material.

Figure 4:
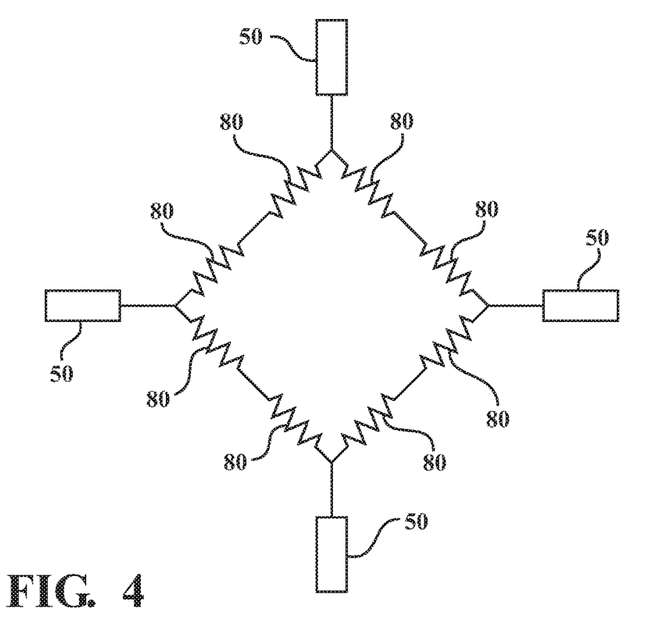
FIG. 4 is a schematic view of an illustrative Wheatstone bridge wiring configuration.

A plurality of foil type strain gages 80 are affixed to a bottom surface 82 of the flexure member 70. The bottom surface 82 is located opposite the top surface 76. The plurality of strain gages 80 includes two strain gages mounted on each leg 71 of the cross shaped flexure member 70, as shown in FIG. 3. The strain gages 80 are in electrical communication with each other and with the pins 50. The strain gages 80 and pins 50 are preferably wired in a Wheatstone bridge configuration, as shown in FIG. 4.

To use the small scale hermetically sealed load sensor 20, one pair of pins 50 is connected to a power supply and the other pair is connected as a signal output to a meter or the like. A mechanical force load is applied to the load bearing member 75, which is mechanically transferred to the flexure member 70, causing a flex and related strain in the flexure member 70. The flex and related strain is mechanically transferred to the strain sensitive elements 80, thereby altering their electric resistance. The change in resistance unbalances the bridge circuit and produces an output related to the magnitude of the applied load.

Figure 5:
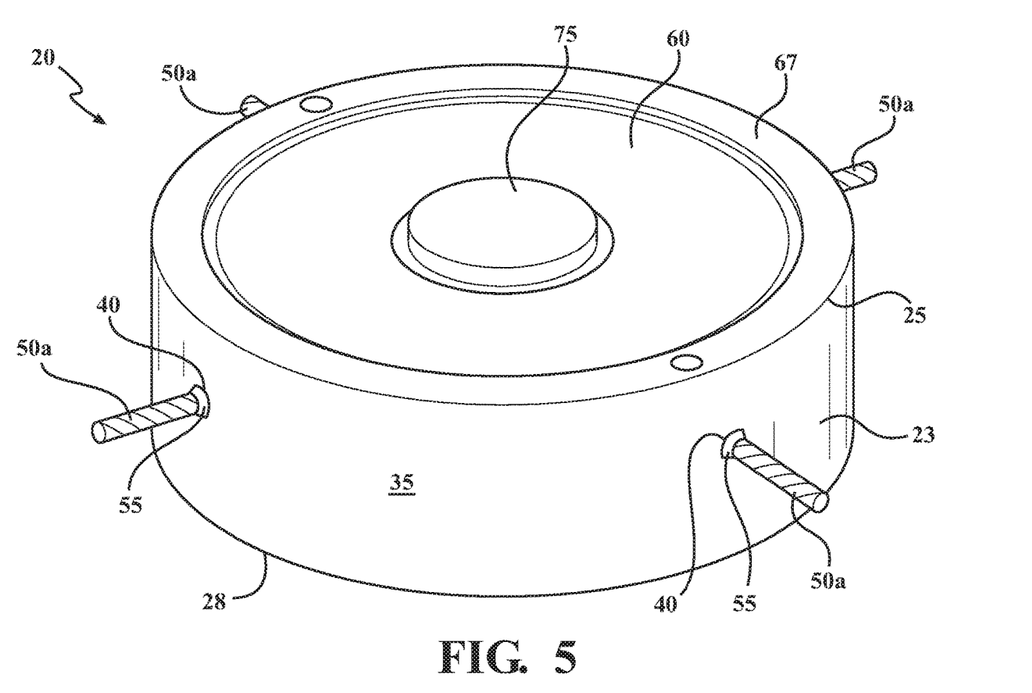
FIG. 5 is a perspective view of a small scale hermetically sealed load sensor.
Figure 6:
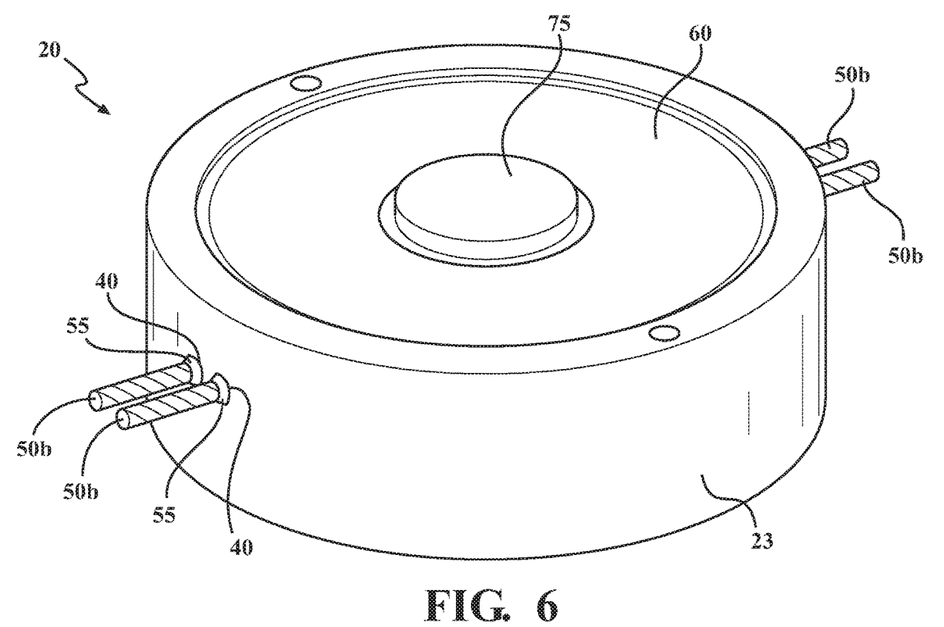
FIG. 6 is a perspective view of a small scale hermetically sealed load sensor.

With reference to FIGS. 5 and 6, the pins 50 are shown located at spaced-apart locations about the perimeter of the body. The pins 50a may be arranged every 90 degrees about the circumference of the one piece shell body 23, with one pin 50a received in each quadrant 72 between the legs 71 of the cross flexure member 70. The pins 50b may alternatively be arranged in pairs, with the pair generally 180 degrees from each other around the circumference of the one piece shell body 23. This spacing is shown only by way of example.

Figure 7:
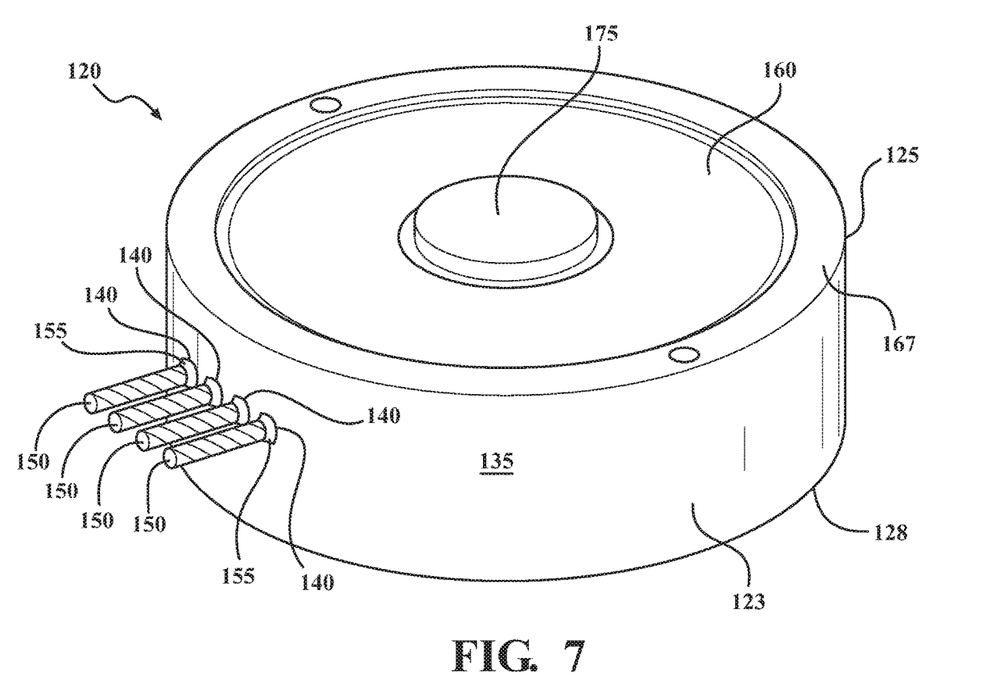
FIG. 7 is another perspective view of the small scale hermetically sealed load sensor of FIG. 1.
Figure 8:
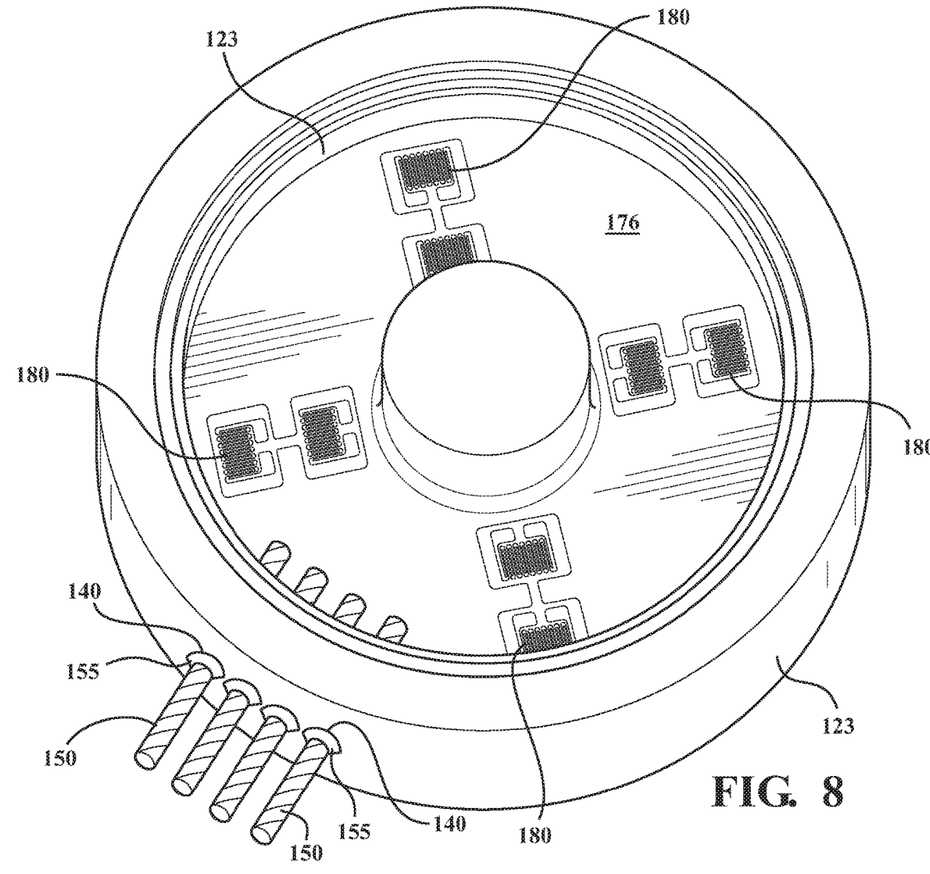
FIG. 8 is a perspective view of a one piece shell body and disc shaped flexure member.
Figure 9:
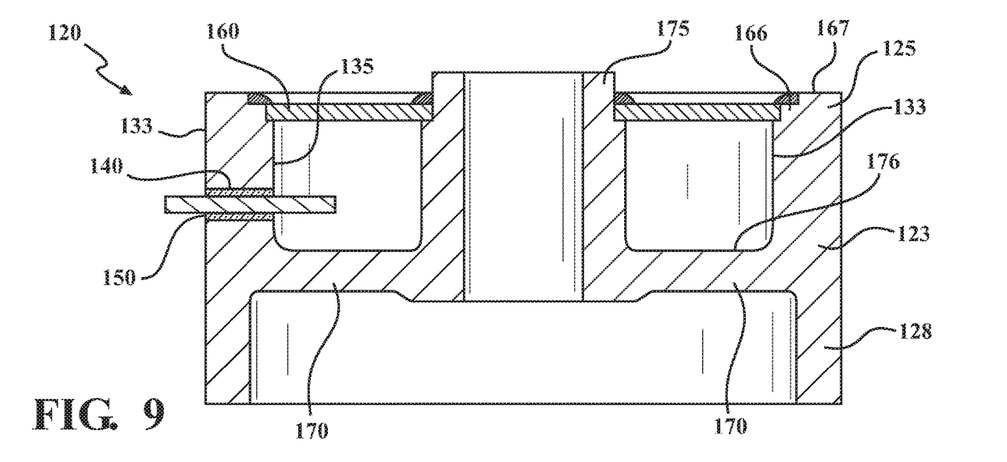
FIG. 9 is a cross sectional view of the small scale hermetically sealed load sensor of FIG. 8.

FIGS. 7 through 9 show another alternate embodiment of a small scale hermetically sealed load sensor 120 having a one piece shell body 123.

The one piece shell body 123 shown in cross-section in FIG. 9 extends between an open first end 125 of the one piece shell body 123 and an opposite second end 128 of the one piece shell body 123. The hollow shape provides an interior surface 133 and exterior surface 135 to the one piece shell body 123. The interior surface 133 and exterior surface 135 define circular interior and exterior perimeters, respectively, of the one piece shell body 123. In other embodiments, these perimeters may define be defined as different shapes, for example, a square external perimeter with a circular interior perimeter.

Cylindrical holes 140 are formed in the shell body 123 between the first end 125 and second end 128, penetrating fully through the shell body 123 from the interior surface 133 to the exterior surface 135. The plurality of holes 140 penetrate the one piece shell body 123 generally perpendicular to the axial direction of the one piece shell body 123 extending between the first end 125 and the second end 128.

Header pins 150 are disposed within the holes 140, with each pin 150 disposed in an individual hole 140. The pins 150 are greater in length than the holes 140, such that the pins 150 extend beyond both the interior surface 133 and the exterior surface 135 of the shell body 123 when the pins 150 are fused in the holes 140. The pins 150 are generally cylindrical in shape. Ends of the pins 150 may be flattened (not shown) to facilitate connection of electrical components, as discussed above.

Seal members 155 are disposed within the holes 140, surrounding the pins 150 and filing the annular spaces between the exterior surfaces of the pins and the interior surfaces of the holes. The seal member 155 contacting surrounds the entire circumference of a center portion of the pin 150 and the entire inner circumference of the hole 140, filling the space between the pin 150 and hole 140. The seal members 155, when fused, hermetically seal the holes 140 and prevent entry of foreign matter into the sensor 120 while providing electric insolation and insulation between the pins 150 and one piece shell body 123. The seal member 155 is made of glass, ceramic, or other similar material capable of being heat fused but tolerant of the temperatures used in autoclaving processes. Specifically, the seal member 155 is a glass, ceramic or other material capable with maintaining a high level of hermeticity and barrier to outside conditions of pressure, temperature, humidity and vacuum.

The open first end 125 of the one piece shell body is enclosed by a washer shaped diaphragm 160. The diaphragm 160 is disposed within the one piece shell body 123 at the first end 125. To receive the diaphragm 160, the perimeter of the interior surface 135 at the first end 125 is formed with a step shaped surface 166 designed to conform to an outer diameter of the diaphragm 160. The step shaped cross section 166 includes two steps formed by surfaces that extend alternately between an axial direction and a radial direction of a central axis of cylindrical shaped one piece shell body 123. The first step provides a circumference to the interior surface 133 with smaller diameter, as compared to the second step. The circumference at the first step is generally equal to the outer circumference of the diaphragm 160 revived therein. The second step provides an area for a sealing and securing material, such as a welding bead, to hermetically seal the diaphragm 160 to the one piece shell body 123 at a location interior of a most distal surface 167 of the first end 125.

A disc shaped flexure member 170 extends generally perpendicularly from the interior surface 133 of the one piece shell body 123. The disc shaped flexure member 170 extends continuously from around the entire circumference of the interior surface 133 towards the center of the one piece shell body 123. The disc shaped flexure member 170 is located further from the first end 125 of the one piece shell body 123 than the pins 150 and holes 140. To put it another way, the pins 150 and holes 140 are located between the diaphragm 160 and the disc shaped flexure member 170. The continuous extension of the disc shaped flexure member 170, and the location relative to pins 150 and holes 140, hermetically seals the load sensor 120 without need of a separate diaphragm at the second end 128.

A load bearing member 175 extends generally perpendicularly from the center a top surface 176 the flexure member 170 along the central axis of cylindrical shaped one piece shell body 123. The load bearing member 175 extends though the washer shaped diaphragm 160 beyond the most distal surface 167 of the first end 125. The load bearing member 175 is sealed and secured to the washer shaped diaphragm 60 continuously around an entire perimeter of the load bearing member 175 to hermetically seal the load sensor 120.

As an exemplary system, foil type strain gages 180 are mounted on the top surface 176 of the disc shaped flexure member 170. The strain gages 180 are mounted in pairs at generally 90 degree intervals around the load bearing member 175. The strain gages 180 are connected in electrical communication with each other and with the pins 150 by, for example, a Wheatstone bridge circuit. The strain gages 180 and pins 150 are wired in a Wheatstone bridge configuration, similar to the configuration of pins 50 and gages 80 shown in FIG. 4.

The used and function of small scale hermetically sealed load sensor 120 is similar to the small scale hermetically sealed load sensor 20 discussed above.

Figure 10:
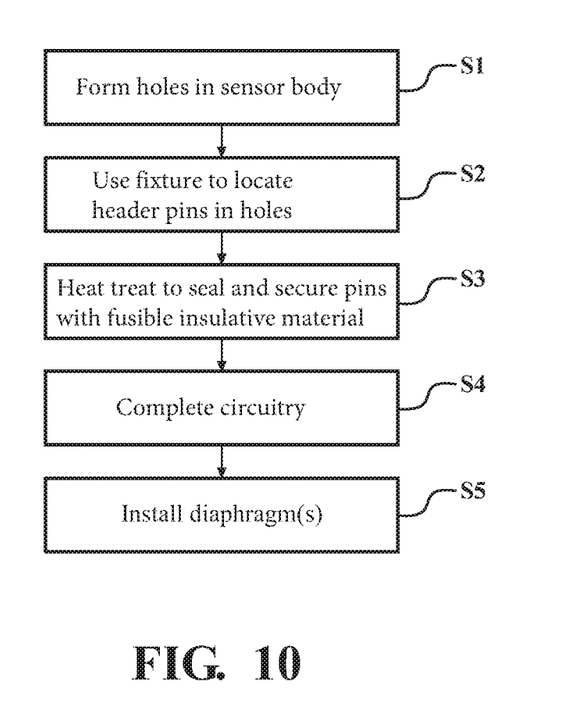
FIG. 10 is a flow chart of a method for manufacturing a small scale hermetically sealed sensor that could be a load, pressure or torque sensor.
Figure 11:
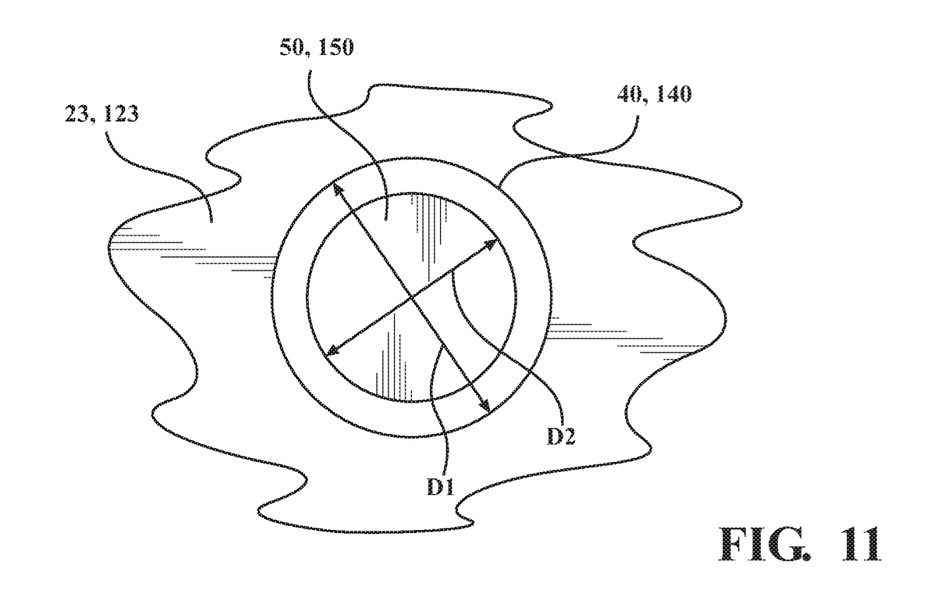
FIG. 11 is a close up view of a hole and pin in a one piece shell body.

As outlined in FIG. 10, manufacturing a small scale hermetically sealed load sensor involves the following steps: forming holes through the wall of a one piece shell body S1; installing pins and seals into the one piece shell body using a suitable fixture S2; heat treating the one piece shell body to fuse the seals and secure the pins S3; installing circuitry such as strain gages and wiring S4; and installing diaphragm(s) S5.

At step S1, the one piece shell body is provided with a flexure member and a load bearing member. The one piece shell body, the flexure member and the load bearing member may be integrally formed from a continuous piece of material by machining the one piece shell body, the flexure member and the load bearing member from the same blank of stock material.

At step S2 the pins and seals are installed. The pins are inserted into the center of the ring shaped seal, and the seal and in pin combination is inserted into a hole in the shell body. The pin fits snugly into the seal, and the pin and seal combination fit snugly into the hole of the shell body and are held in place by a suitable fixture to maintain their position during the thermal fusion process. The seals are made of glass or ceramic and initially have the shape of a ring or donut. The pins are made from an electrically conductive material.

At step S3 the shell body, pins, and glass seals are heat treated to hermetically seal and secure the pins within the holes. The heat treat process subjects the various pieces to an environment heated sufficiently to cause the shell body material to expand, thereby contracting the size of the holes, and to cause the glass seals to melt and begin to undergo phase change to have plastically deformable fluid properties, fusing the glass seal to the pin and shell body. The contracting holes press into the molten glass seals to secure and seal the glass to the shell body. Additionally, the molten glass is pressed onto the pin around the circumference of the pin, securing and sealing the glass to the pin. To fuse the seal member, it is heated to a temperature of 750 to 850 degrees or, for glass, to a temperature above 1600° F. with the seal member wetting the entire circumference of the hole and the pin. The fusing temperature is much higher than, for example, an autoclaving temperature discussed above. Proper material selection and part sizing is necessary to ensure a hermetic seal between the pin and the shell body by the glass. Examples of suitable materials for the shell body include titanium, Inconel, and 304 stainless steel. It is desirable for the pin to have a low thermal expansion, an exemplary material for the pin is known in the trade as Kovar, consisting of 29% Ni, 17% Co, <0.01% C, 0.2% Si, 0.3% Mn, and a balance of Fe, with given percentage by weight. The pins may be plated with conductive material such as Nickel and/or copper or gold that inhibits oxidization.

At step S4, after the heat treatment has been performed, the sensor elements are mounted onto or otherwise joined to the flexure member, and wired to the pins. Installing and wiring is done after heat treatment to prevent damage to the gages.

At step S5 the diaphragm(s) are installed. Installation of the diaphragm(s) includes positioning the diaphragm in the proper location relative to the one piece shell body, and securing the diaphragm to the shell body around the outer circumference and inner circumference, if available, of the diaphragm(s). The diaphragm(s) may be made of a metal material secured and sealed to the shell body with a welding bead.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A small-scale, autoclave-tolerant load cell with hermetically sealed interior volume and an integral header structure comprising:
   a metal housing defining a wall with inside and outside surfaces oriented around a central axis;
   a flexure body within the housing and integrally formed therewith;
   said flexure body defining a surface wholly within the housing wall and an integral central load bearing member located on said central load axis and having a top surface;
   a diaphragm member sealingly affixed to and lying between the load bearing member and the inside surface of the housing wall to, in part, define said sealed interior volume, said diaphragm being spaced from the flexure body to seal the interior volume while leaving the top surface of the load bearing member fully exposed outside of the sealed volume for direct application of measured forces thereto along said load axis;
   a plurality of strain sensing means disposed exclusively on a single surface of the flexure body which surface is within the sealed volume;
   said strain sensing means being connected into a signal generating circuit within said volume; and
   a plurality of header pins extending from the sealed volume fully through the housing wall substantially at right angles to the load axis, said pins each being both sealed to and electrically insulated from the housing wall by a material chosen from the group consisting of glass or ceramic;
   whereby electrical power can be connected to the signal-generating circuit within the sealed volume by way of a first pair of said header pins and electrical signals taken from the circuit to the outside of the sealed volume by way of second pair of said header pins.

2. The small-scale, autoclave-tolerant load cell of claim 1 wherein the housing wall surfaces are annular, and the flexure body is a solid disk with an axially raised center portion forming said load bearing member integrally surrounded by the surface on which the strain-sensing means are disposed.

3. The small-scale, autoclave-tolerant load cell defined in claim 2 wherein the strain sensing means are foil strain gages arranged into groups extending radially from said load axis.

4. The small-scale, autoclave-tolerant load cell defined in claim 1 the pins are arranged in a group of four parallel, closely spaced pins.

5. A method of manufacturing the small-scale autoclave-tolerant load cell defined in claim 1 comprising the steps of:
   fusing said material around the header pins as said pins are held in holes extending through said housing wall;
   thereafter applying said strain sensing means to said flexure surface and connecting said strain sensing means in a bridge circuit; and
   thereafter installing said diaphragm member.

6. A small-scale, autoclave sterilization process tolerant load cell with a hermetically sealed interior volume containing strain sensing, signal generating circuitry comprising:
   a one-piece body defining a housing with a continuous annular wall arranged a around a load axis, a flexure structure within and integral with said wall, and load bearing member on the load axis and having an exposed surface for direct application of measured load forces thereto so as to flex said flexure structure;
   a diaphragm sealingly attached to said continuous wall to define, in part, said interior volume;
   a plurality of strain sensing elements operatively attached to a single surface of said flexure structure and connected into a signal generating circuit within said sealed interior volume; and
   a plurality of header pins sealingly and insulatingly attached to said housing and extending from said interior volume through said wall to transmit signals from said signal generating circuitry out of said volume.

7. The small-scale, autoclaved sterilization process tolerant load cell as defined in claim 6 wherein said diaphragm is sealingly connected to and disposed between an inside surface of said continuous wall and said load bearing member.

* * * * *